No. 655,321. Patented Aug. 7, 1900.
J. C. ANDERSON.
AUTOTRUCK VEHICLE.
(Application filed Sept. 23, 1899.)
(No Model.) 3 Sheets—Sheet 1.

No. 655,321. Patented Aug. 7, 1900.
J. C. ANDERSON.
AUTOTRUCK VEHICLE.
(Application filed Sept. 23, 1899.)
(No Model.) 3 Sheets—Sheet 2.

Witnesses
Inventor
Jas. C. Anderson
By
Attorney

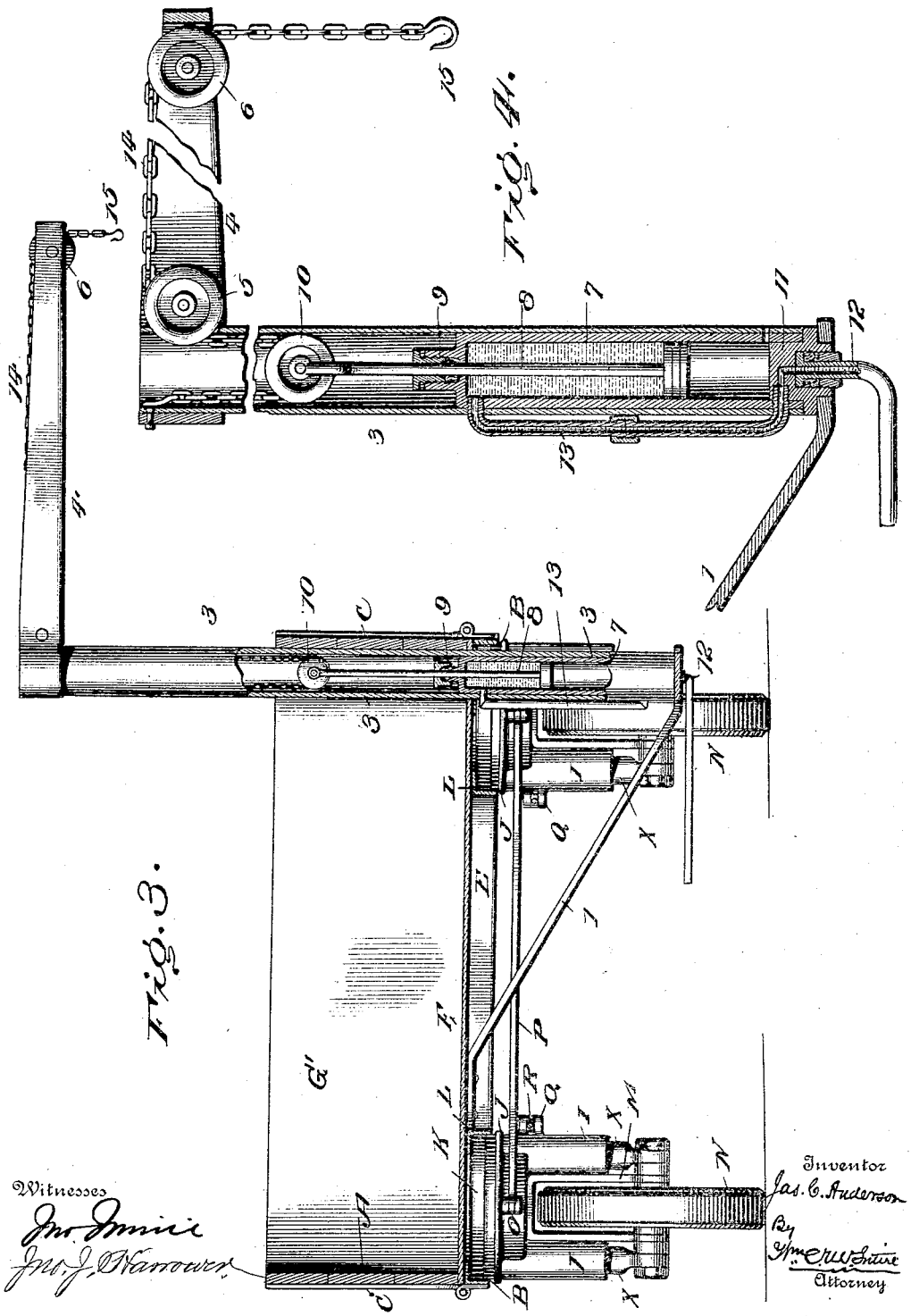

UNITED STATES PATENT OFFICE.

JAMES C. ANDERSON, OF HIGHLAND PARK, ILLINOIS.

AUTOTRUCK VEHICLE.

SPECIFICATION forming part of Letters Patent No. 655,321, dated August 7, 1900.

Application filed September 23, 1899. Serial No. 731,462. (No model.)

*To all whom it may concern:*

Be it known that I, JAMES C. ANDERSON, a citizen of the United States, residing at Highland Park, in the county of Lake and State of Illinois, have invented certain new and useful Improvements in Autotruck Vehicles; and I do hereby declare the following to be a full, clear, and exact description of the invention, such as will enable others skilled in the art to which it appertains to make and use the same.

My invention relates to certain new and useful improvements in autotruck vehicles or vehicles having power within themselves for propulsion, and especially to that class designed for carrying heavy loads.

In all large cities the vehicles designed for trucking are necessarily limited in proportion, because in exact proportion to the size and character of the vehicle the animal power must be commensurate, and therefore the space required for the truck and animals is limited, and consequently a multiplicity of vehicles becomes necessary to transport a given large amount of freight or frequent trips of a limited number of vehicles to transport the same.

My invention has for one object to provide a vehicle which will carry a given bulk and weight of freight and occupy less superficial area of street-surface than an ordinary vehicle of equal capacity, and consequently a less number of such vehicles of reasonable dimensions will be required than would otherwise be the case.

My invention has for a further object to provide a vehicle which may be loaded and unloaded with greater rapidity and less manual labor than the ordinary truck.

With these ends in view my invention consists in the construction and arrangement hereinafter and in detail described.

In order that those skilled in the art to which my invention appertains may know how to make and use the same, I will proceed to describe the construction and operation of my improved autotruck vehicle, referring by characters to the accompanying drawings, in which—

Figure 1:
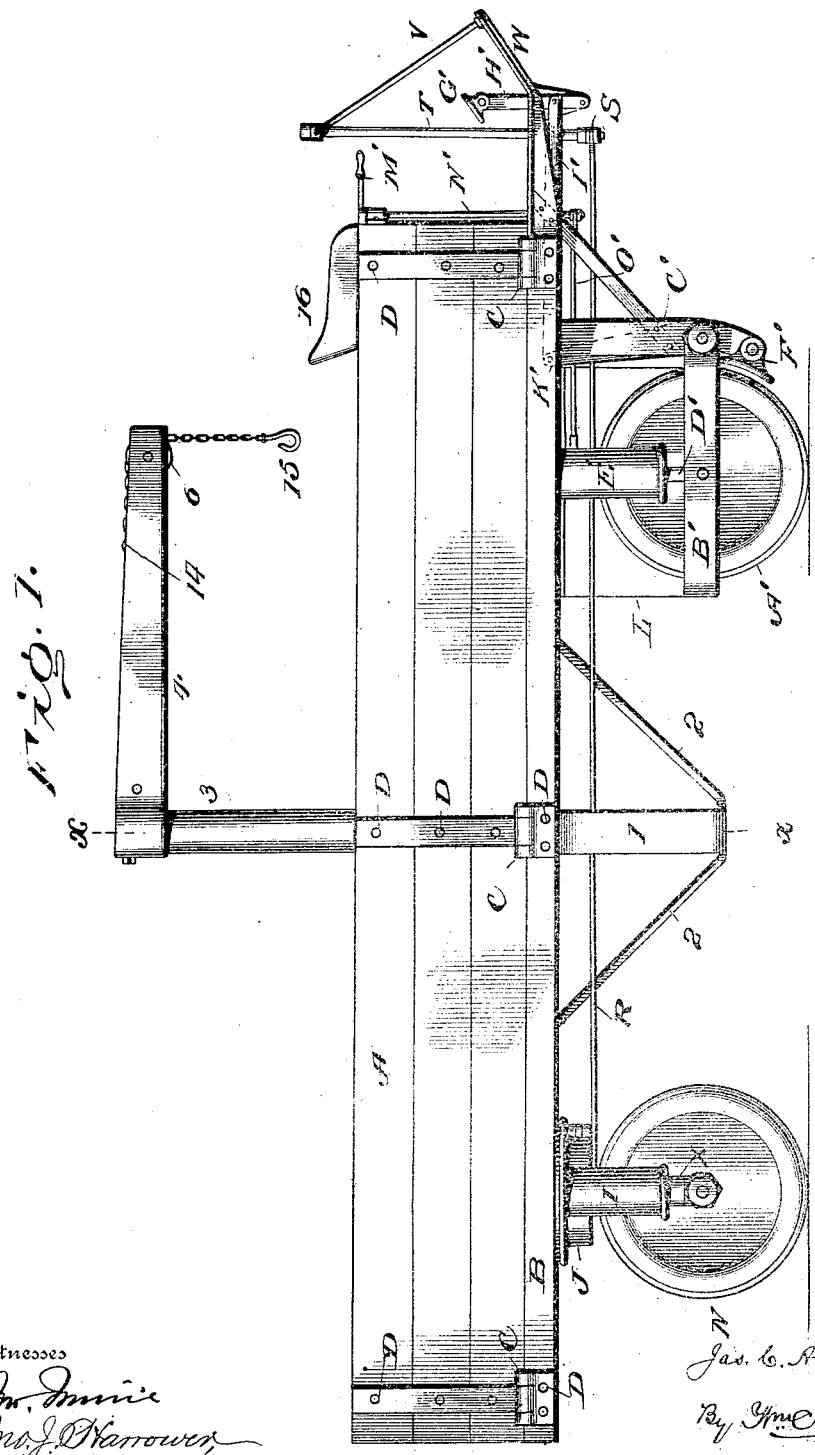
Figure 2:
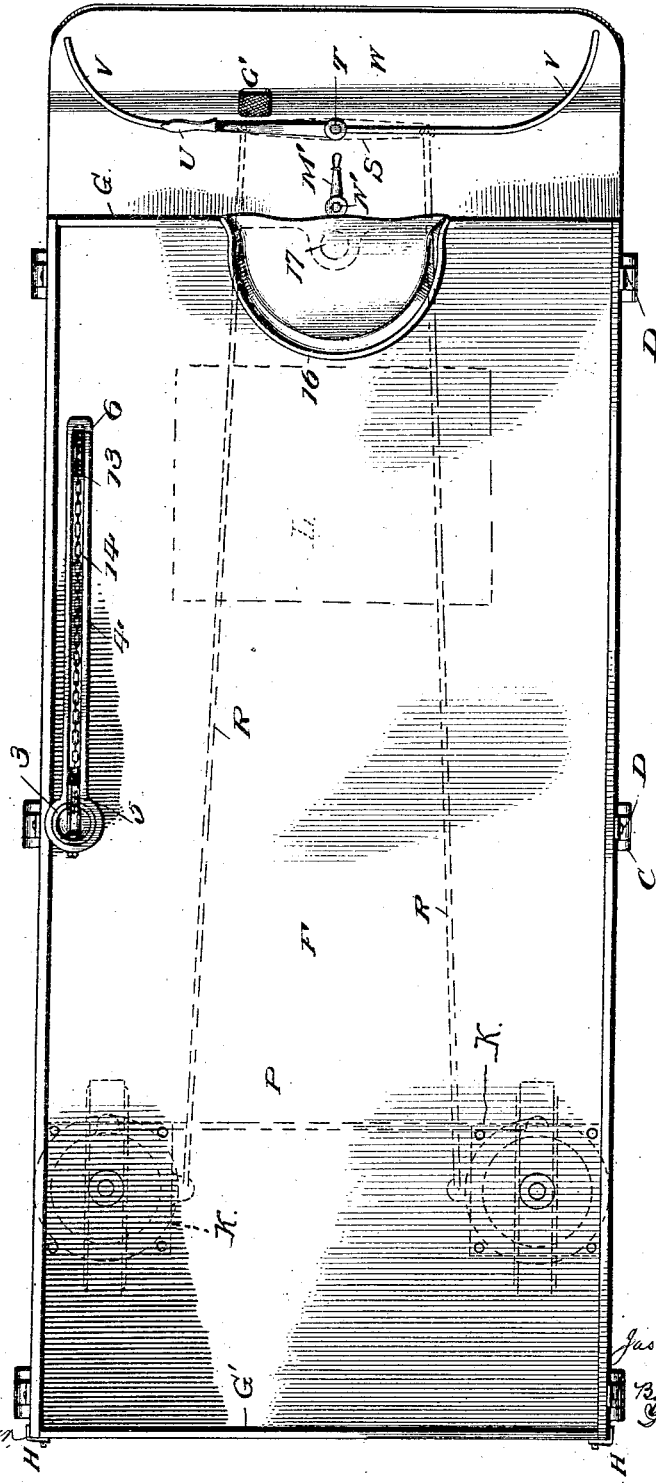

Figure 1 is a side elevation of a vehicle embodying my invention. Fig. 2 is a top or plan view. Fig. 3 is a cross-section on the line $x\ x$ of Fig. 1, but showing the crane-arm at right angles to the body of the vehicle and in elevation; and Fig. 4 is a section of the crane on enlarged scale and taken on the same line.

Similar characters of reference denote like parts in the several figures of the drawings.

A represents the sides of the body, which are hinged to the side frame B of the bottom by hinges C, one leaf of which extends, as shown, to the upper edge of the sides, to which it is securely fastened by screws or screw-bolts D. The platform or bottom frame is composed of a series of channel-beams E (see Fig. 3) at suitable distances apart and secured in position by the angle-beams B, which constitute the sides of the frame.

F is the bottom, laid upon and secured to the channel-beams of the frame, and G and G' are the front and end, respectively, of the body.

The sides are secured in their elevated position and proper relation with the front and end of the body by hooks or hasps and staples H or in any other preferred manner.

I I are twin spring-cylinders formed integral with a circular head J, upon which the body is mounted through the medium of a plate K, secured to the under side of the bottom of the vehicle and mounted with ball-bearings upon the head J in substantially the manner shown and described in an application filed by me on the 5th day of September, 1899, Serial No. 729,484, for improvement in motor-cars.

The plates K are square at the top, as shown in dotted lines at Fig. 2, and in addition to the bolts at the four corners are held between the longitudinal angle-irons B and similarly-shaped short angle-irons L, arranged between the channel-beams E, which are bolted in place and constitute stiffening-braces to the frames. The circular head J is countersunk on the under side and formed with a central passage for the stem of the fork, which carries at its lower ends the axle upon which the wheels N rotate.

The head J of the spring-cylinders I are formed with lugs O, in which the ends of a rod P are pivoted, and similar lugs Q at right angles to the lugs O are formed on the inner spring-cylinders I, from which latter lugs extend steering-rods R, (shown in dotted lines at Fig. 2 and also in solid lines at Fig. 1,) the forward ends of which are pivotally connected to the opposite ends of a centrally-pivoted vibrating arm or lever S, which is operated by a rock-shaft T and radial arm U, the upper end of the rock-shaft being journaled and supported in a brace V, extending from the footboard W, mounted upon and secured to the projecting ends of the angle-irons B, as clearly shown at Fig. 1. From the construction shown it will be seen that when the shaft T is rocked in either direction by the radial arm V one of the rods R will be drawn forward, and consequently the spring-cylinder to which it is pivoted will likewise be drawn forward, causing it and its twin, likewise the head J, to rotate upon the ball-bearing between the head and the circular plate, and as the fork M and spring-piston X are mounted upon the axles of the wheels N the latter will rotate with the head J, all as fully described in the pending application hereinbefore referred to. The connecting-rod P between the inner cylinders I will cause the wheels at the opposite sides of the vehicle to rotate together, and consequently the vehicle will be steered in an obvious manner. 1 is a brace bolted at its upper end to the bottom F and extending obliquely to a point below one side of the body of the vehicle, where it branches in opposite directions, as shown at 2 2, with the upper ends of said branches also securely connected to the under side of the bottom F, all as clearly shown at Figs. 1 and 3. The brace constitutes a step or platform, upon which is rotatively mounted a hollow metal tube 3, to the upper end of which is secured a radial bifurcated arm 4, in which are journaled two chain-pulleys 5 6. The hollow post or tube 3 passes through the bottom F and is thus supported in its vertical position. Within the lower end of the tube 3 is secured a metal cylinder adapted to receive a piston 8, which passes through a packing 9 at the upper end of the cylinder and is bifurcated to receive a pulley 10, which is journaled therein. The lower end is closed by a solid plug 11 within a suitable recess, in the lower end of which is rotatively secured a feed-pipe 12, suitably packed and communicating with a vertical and radial passage in the plug. (Clearly shown at Fig. 4.) A vertical pipe 13 connects at its lower end with the radial passage in the plug 11, and its upper end is threaded into the cylinder 7 near its upper end and above the head of the piston 8 when it is in its most elevated position. A chain 14, having one end firmly secured to the upper end of the hollow post or tube 3, passes around the pulley 10 in the end of the piston, thence up and over the pulleys 5 and 6, and is provided at its free end with a hook 15, as clearly shown.

The pipe 12 connects with a reservoir L', as shown in Fig. 1 and in dotted lines at Fig. 2, containing steam, air, or other suitable agent for operating the piston 8, and the supply and exhaust are controlled by an ordinary two-way cock suitably located in the pipe 12. The tube 3 and arm 4 constitute a revolving crane, and any load secured to the hook 15 is raised in an obvious manner by the downward stroke of the piston 8, and consequently the crane and its connections provides a loading device which may be readily operated by one man. The crane is located centrally of the two ends of the vehicle, and the arm 14 is of such length that the load lifted by the hook 15 may be deposited at any desired locality.

16 is a driver's seat which is secured in position by a pivot 17, as shown in dotted lines at Fig. 2, and it may be turned out of the way when the loading or unloading is in progress.

The front or traction wheels A' are journaled in vibrating forks B', which are pivoted at one end to a vertical leg C', secured to the body of the vehicle, and to the axle of the wheel, near each end, are pivotally connected pistons D', which reciprocate in spring-cylinders E', provided with springs, as fully described in the application before referred to.

F' is a brake-shoe operated through the medium of a foot-brake G' and levers I' and K', as clearly shown at Fig. 1.

L" is a motor of any desired form, and hence I have illustrated it by a simple diagram. It may be secured in place upon any suitable support connected to the frame of the vehicle and connected by gears or sprocket wheels and chains with the traction or driving wheels A' and controlled by the driver through the medium of a hand-lever M', rock-shaft N', and rod O' in an obvious manner.

The sides being hinged, as shown, may be turned outwardly and downwardly to permit the free sweep of the crane and any load suspended thereto, and as the supporting-wheels of the vehicle are intended to be only about twenty-four to thirty inches in diameter the sides A when turned down obliquely will contact with the sidewalk or foot-pavement and constitute an inclined platform, upon which the vehicle may be loaded by hand when the character of the freight does not require the degree of power exerted by the crane.

Many changes may be made in the mere details of construction without departing from the spirit of my invention, the gist of which rests in the idea of a vehicle provided with auto or inherent power of propulsion and with a swinging loading-crane and means for operating the same, as heretofore explained.

While I have shown the sides adapted to turn outwardly and downwardly for the purposes explained and prefer such construction and arrangement to avoid the raising of freight or packages to an undue height and to facilitate loading without the use of the crane, it will be understood that I may make the sides fixed in relation to the other parts of the body, if deemed desirable.

With my improved vehicle it will be seen that I not only dispense with the necessity of all animal power for moving the vehicle, thus increasing the carrying capacity and superficial area of the same without infringing upon the traffic area of the roadway or street and requiring a less number of vehicles to transport a given quantity of freight, but that I am also enabled to utilize the power carried for the propulsion of the vehicle to operate the loading and unloading devices.

Having described the construction, operation, and advantages of my improved autotruck vehicle, what I claim as new, and desire to secure by Letters Patent, is—

1. An autotruck vehicle embodying in its organization a body mounted upon driving and steering wheels, means for rotating the driving-wheels, means for controlling the steering-wheels, a power-storage tank or cylinder connected with the driving mechanism, a revoluble crane mounted upon the body and provided with lifting mechanism and means intermediate of the lifting mechanism and the storage tank or cylinder for applying power to the lifting mechanism, substantially as and for the purposes set forth.

2. In combination with the steering-wheels N, spring-cylinders I, head J, and lugs O and Q, the rod P connected at its opposite ends to the lugs O, the steering-rods R, connected to the lugs Q, and a vibrating lever S, the rock-shaft T and radial lever U, substantially as and for the purpose set forth.

3. In an autotruck vehicle, the body composed of transverse channel-beams E, longitudinal angle-irons B and sides A, hinged to the angle-irons B and adapted to be raised and lowered, substantially as and for the purposes set forth.

4. In combination with an autotruck vehicle mounted upon driving and steering wheels and provided with a reservoir containing steam, air, or other similar agent; a revolving crane mounted upon a suitable step or platform connected with the body of the vehicle, and provided with a reciprocating piston and a lifting cable or chain operated by the piston, substantially as and for the purpose described.

5. In combination with the autotruck vehicle provided with a reservoir containing steam, compressed air or other suitable agent, the revolving crane mounted upon a step or platform and consisting of the tubular post 3, bifurcated radial arm 4, provided with pulleys 5 and 6, the cylinders 7, piston 8, pulley 10, cable or chain 14, the plug 11, provided with vertical and radial passage, the conduit-pipe 12, and vertical pipe 13, constructed and arranged to operate as hereinbefore set forth.

In testimony whereof I affix my signature in presence of two witnesses.

JAMES C. ANDERSON.

Witnesses:
JENNIE G. BOOTH,
JNO. J. HARROWER.